United States Patent
Murali et al.

(10) Patent No.: US 9,582,524 B1
(45) Date of Patent: Feb. 28, 2017

(54) TRANSFORMATIVE MIGRATION OF STATIC DATA

(75) Inventors: Srikanth Murali, Seattle, WA (US); Thomas J. Ahearn, Seattle, WA (US); Hanson Char, Mercer Island, WA (US); Alan G. Davison, Redmond, WA (US); Brian P. King, Port Orchard, WA (US); Isuru Ranaweera, Seattle, WA (US); Zhengqiang Xu, Kenmore, WA (US); Stepan P. Yakovlev, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 390 days.

(21) Appl. No.: 13/526,843

(22) Filed: Jun. 19, 2012

(51) Int. Cl.
*G06F 17/30* (2006.01)

(52) U.S. Cl.
CPC .................................. *G06F 17/303* (2013.01)

(58) Field of Classification Search
CPC .......................... G06F 17/303; G06F 17/30557
USPC .............................................. 707/626, 999.1
See application file for complete search history.

(56) References Cited

U.S. PATENT DOCUMENTS

| | | | |
|---|---|---|---|
| 6,122,640 A * | 9/2000 | Pereira | 707/648 |
| 6,480,850 B1 * | 11/2002 | Veldhuisen | 707/610 |
| 6,598,134 B2 * | 7/2003 | Ofek et al. | 711/162 |
| 7,325,129 B1 * | 1/2008 | Mattsson | G06F 21/6227 380/28 |
| 8,082,452 B2 * | 12/2011 | Jajodia | 713/193 |
| 8,150,811 B1 * | 4/2012 | Tarenskeen et al. | 707/659 |
| 8,165,305 B2 * | 4/2012 | Chrysler | G06F 21/6227 380/277 |
| 8,554,730 B2 * | 10/2013 | Mujumdar et al. | 707/626 |
| 2002/0161754 A1 * | 10/2002 | Janssen | 707/3 |
| 2004/0122865 A1 * | 6/2004 | Stahl | G06F 17/303 |
| 2004/0199517 A1 * | 10/2004 | Casati et al. | 707/100 |
| 2005/0055194 A1 * | 3/2005 | Krause | G06Q 10/10 703/22 |
| 2006/0041533 A1 * | 2/2006 | Koyfman | G06F 17/30312 |
| 2006/0218405 A1 * | 9/2006 | Ama et al. | 713/181 |
| 2007/0079119 A1 * | 4/2007 | Mattsson et al. | 713/164 |
| 2007/0112876 A1 * | 5/2007 | Blaisdell | G06F 17/30563 |
| 2008/0249902 A1 * | 10/2008 | Lehman et al. | 705/30 |
| 2009/0177671 A1 * | 7/2009 | Pellegrini | G06F 9/5038 |
| 2009/0240956 A1 * | 9/2009 | Metzger et al. | 713/193 |
| 2011/0173676 A1 * | 7/2011 | Peckover | 726/3 |
| 2012/0041933 A1 * | 2/2012 | Driesen | 707/702 |
| 2012/0179723 A1 * | 7/2012 | Lin et al. | 707/792 |
| 2012/0265726 A1 * | 10/2012 | Padmanabhan | G06F 17/303 707/602 |

(Continued)

*Primary Examiner* — Miranda Le
(74) *Attorney, Agent, or Firm* — Lee & Hayes, PLLC

(57) ABSTRACT

Techniques are described for migrating data from a first table to a second table while transforming at least one characteristic of the data. Characteristics transformed may include one or more of an encryption key or method, a table schema, a data structure, or a storage infrastructure. Migration may be performed in two or more phases. A first phase may migrate and transform a majority of the data, such as data that is older than a certain threshold age. A second phase may migrate and transform the remaining, newer data. A status table may indicate which tables are active and are to be written to and read from during data writing and data consuming processes. Moreover, embodiments support data replication across multiple regions.

27 Claims, 8 Drawing Sheets

(56) References Cited

U.S. PATENT DOCUMENTS

2012/0303577 A1* 11/2012 Calder et al. ................. 707/613
2013/0151491 A1* 6/2013 Gislason ........... G06F 17/30339
   707/696

* cited by examiner

TRANSFORMATIVE MIGRATION OF STATIC DATA

BACKGROUND

Large internet-based enterprises such as e-commerce companies generally collect and store large amounts of data including customer information, product information, sales records, shipping data, operations data, and the like. Such large amounts of stored data may present challenges when migrating data to a different structure, table schema, or encryption scheme, particularly when the data remains live and accessible during the migration. Existing solutions of transforming the data may lead to data corruption from which it may be difficult to recover.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1A:
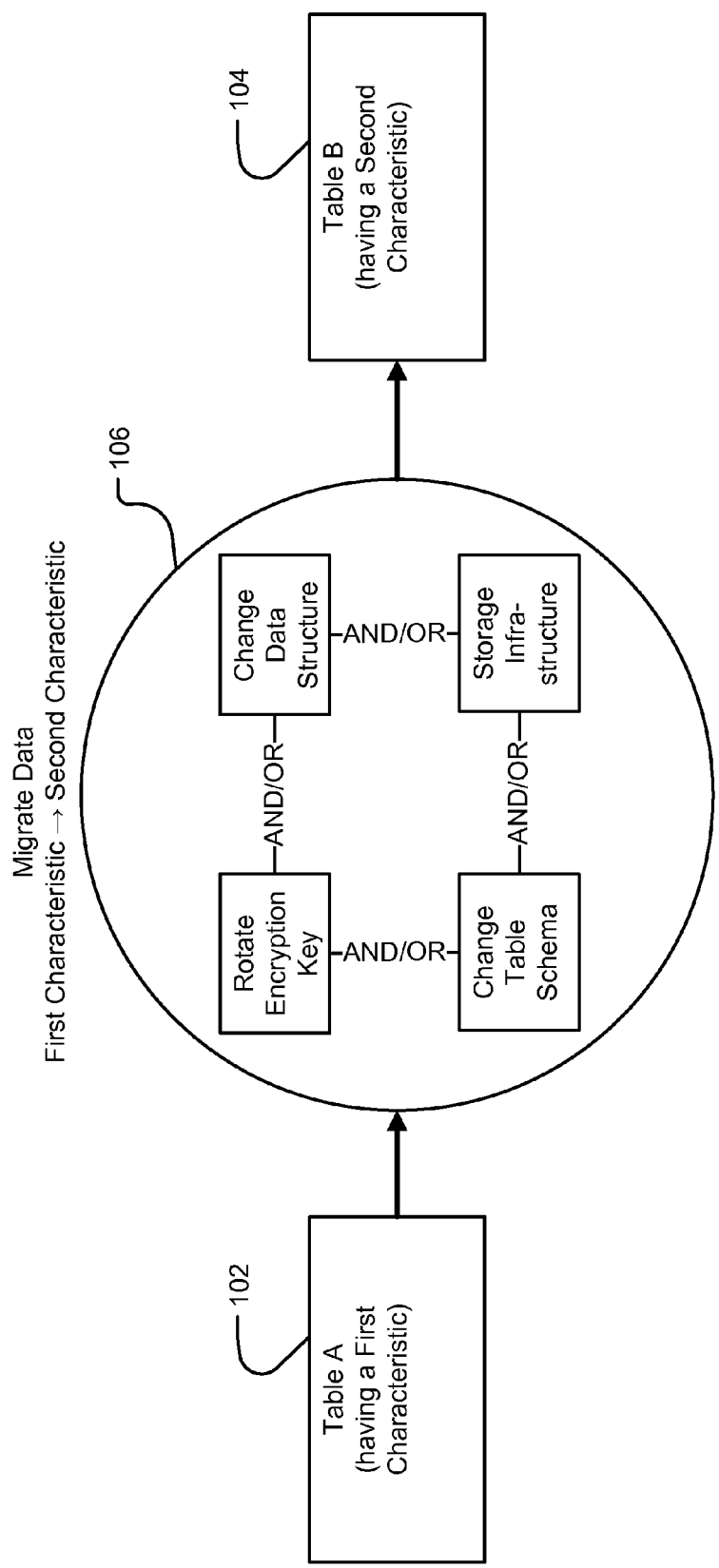
FIGS. 1A, 1B, and 1C depict diagrams of example processes for migrating data, in accordance with embodiments.

Because certain risks may be incurred by transforming live data in place, for example in situations where the data is being accessed while the transformation is taking place, embodiments provide for migration of data from a first table to a second table while transforming the data from a first characteristic to a second characteristic. FIG. 1A depicts an example process in which data stored in Table A 102 having a first characteristic is migrated to data stored in Table B 104 having a second characteristic through use of a migrate data process 106 which migrates the data while transforming the data from a first characteristic to a second characteristic. As shown, the first and second characteristics may include but are not limited to one or more of the following: an encryption key, a table schema, a data structure, or a storage infrastructure. Each of these example characteristics is described further below.

In some embodiments the data may be data that is stored in an encrypted form, for example through use of a Hardware Security Module (HSM). Such embodiments may enable a rotation (e.g., change) of an encryption key or algorithm such that the original data in Table A is encrypted using a first encryption key, a first set of encryption keys, and/or a first encryption algorithm, and the migrated data in Table B is encrypted using a second encryption key, second set of encryption keys, and/or second encryption algorithm. Such data may include sensitive data, including but not limited to financial transaction data (e.g., transaction records), data that enables financial transactions (e.g., bank account numbers, bank routing numbers, financial institution account numbers, financial institution routing numbers, credit card numbers, credit card security information), personal health data, or other data of a sensitive or confidential nature that is stored in an encrypted form. Embodiments support any encryption method, protocol, or technique, with encryption keys of any length. For example, migration may include a transformation of data encrypted using an m-bit key to the data encrypted using an n-bit key.

The characteristic transformed may include a change in table schema from a first schema to a second schema. In some embodiments this change in table schema may include adding or removing a column from a schema, splitting one column into multiple columns, combining multiple columns into a single column, changing a length of one or more columns, and/or changing a data type of one or more columns. A change in table schema may also include splitting one table into multiple tables and/or combining multiple tables into a single table. Embodiments may also support other schema changes.

In some embodiments, the characteristic transformed may include both a change in table schema as well as a change of encryption key and/or encryption method. For example, in cases where data encryption employs a Hash-Based Message Authentication Code (HMAC) the data encryption may depend on a particular table schema that includes a column for an HMAC index. Thus, when migrating data to an HMAC encryption method, the table schema may be transformed to add the new column for the HMAC index.

Further, in some embodiments where a column is being added or additional data is being incorporated into an expanded column, an independent process may be called to retrieve and/or generate the additional data to be added. For example, a customer contact information table may currently include columns for a customer name, home address, and telephone number, and the migration may be used to add an additional column storing e-mail address information. In such cases, an external process may run to retrieve e-mail address information for each row of data corresponding to a particular customer during the migration.

Further in some embodiments the characteristic transformed may include a change in data structure type from a first data structure to a second data structure. Data structure type may include a relational database structure, a hierarchical database structure, a network database structure, or other types of data structures such as hash tables, lists, flat files, and/or unstructured data. For example, migration of data from Table A to Table B may include a transformation of the data from Table A in a relational database to Table B that is a hash table.

Moreover in some embodiments the characteristic transformed may include an underlying storage infrastructure for storage or persistence of data. A transformation of storage infrastructure may include but is not limited to a change in a database technology, database vendor, physical storage medium, storage location, storage mechanism, storage paradigm, and the like. For example, in some cases migration may include an infrastructure transformation such as migrating data stored on a local database to storage on a cloud service. In another example, migration may include migrating data stored using an Oracle® database technology or other technology to storage using a PostgreSQL® (i.e., Postgres) or other object-relational database management system. In another example, migration of data may be from a first table in a database that uses a particular database framework to a second table in a database that operates within a different framework (e.g., a Hadoop® framework).

Moreover, although examples herein describe migration of data from a first table to a second table, it is noted that embodiments are not limited to data structures that are traditionally described as having tables. For example, the first table or second table may include unstructured data not in a table format. Thus, the term "table" is used herein is solely for the sake of clarity, and should not be construed as limiting embodiments to any particular data structure.

In some embodiments the amount of data may be large (e.g., on the order of petabytes or hundreds of terabytes). Moreover, in some embodiments the data migrated is at least partly static data. As used herein, static data may include data that is immutable (e.g., does not change), and static data may also include data that is expected to change less frequently than a certain threshold frequency. For example, a particular row in the data may be expected to change not more frequently than once a month or once a year. Moreover, in some embodiments the data may be live such that active processes are able to access the data while it is being migrated.

Figure 1B:
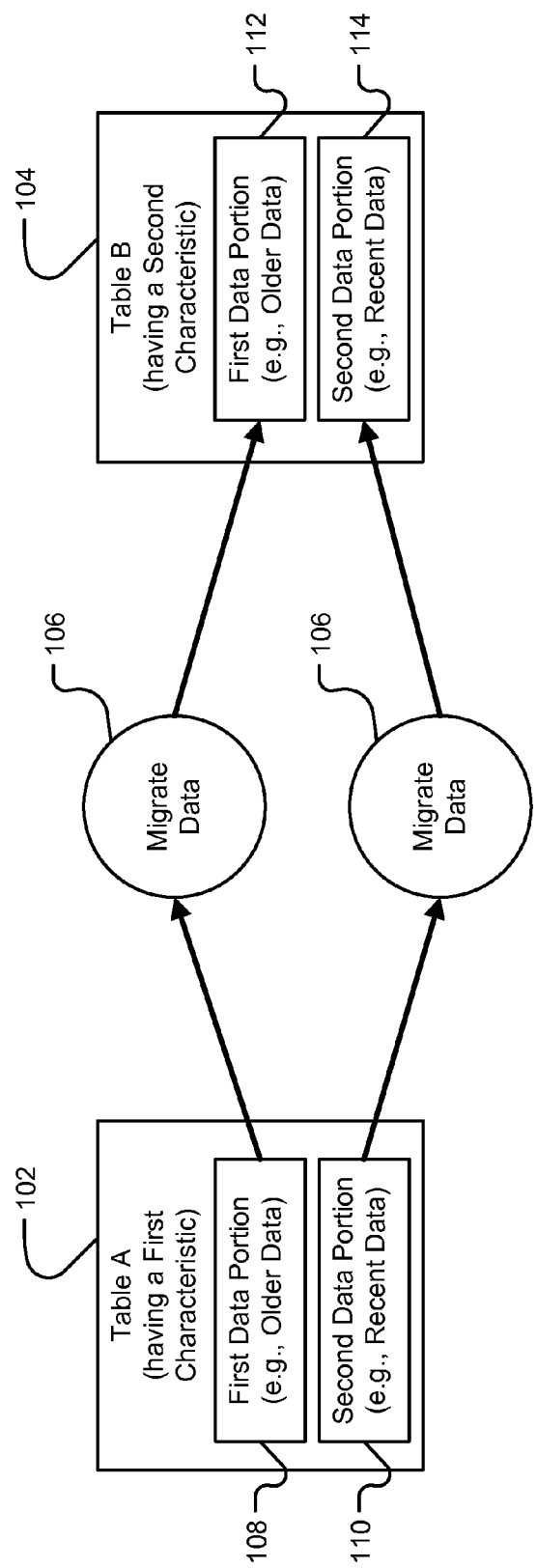

Some embodiments provide for migration of data in at least two portions. For example, as shown in FIG. 1B Table A 102 may have a first data portion 108 and a second data portion 110. In some cases, a first data portion 108 may include zero or more rows whose data is older than a particular threshold age (e.g., older than one day old), and a second data portion 110 may include zero or more rows whose data is at least as recent as a particular threshold age (e.g., one day old or less). As used herein, age of data may refer to a date and time when the data was created (e.g., when a row was added to a table) and/or to a date and time when data was last changed (e.g., when a row was last updated).

In such embodiments, a migrate data process 106 may execute in two phases: a first execution to migrate a first data portion 108 of Table A 102 to a first data portion 112 of Table B 104, and a second execution to migrate a second data portion 110 of Table A 102 to a second data portion 114 of Table B 104. In some embodiments, the two phases may be separate executing instances of migrate data process 106. In other embodiments, the two phases may be separate phases or sub-processes of a single executing instance of migrate data process 106.

In some embodiments, key indexing may be disabled during the first phase of migrating the first data portion such that one or more key indices are not created or updated while the first data portion is being migrated. In cases where the bulk of the data stored is in the first portion (e.g., is older data), disabling key index creation may enable the bulk of the data to be migrated faster and/or more efficiently. In such cases, the primary key index and/or other key indices (e.g., if other indices are used in the table being migrated) may be created after the first data portion has been migrated.

Moreover, in some embodiments a status table may be employed to indicate which table(s) are accessible to other processes or users at any given time. For example, the status table may indicate which table(s) (i.e., Table A and/or Table B) are to be written to by data writing processes, and which table(s) are to be read from by data reading processes, during each phase in the migration. Because the status table may direct data reading processes and/or users and data writing processes and/or users to the appropriate table during each phase of the migration without any particular intervention or action by the processes or users, the migration and transformation may proceed in a manner that is transparent to processes or users. In some embodiments, the status table is a table in a database (e.g., a relational database). However, embodiments are not so limited and embodiments may support any type of data store with structured data or unstructured data (e.g., a flat file) for storing table status information. Use of a status table in embodiments is described further with reference to FIGS. 4A and 4B.

Figure 1C:
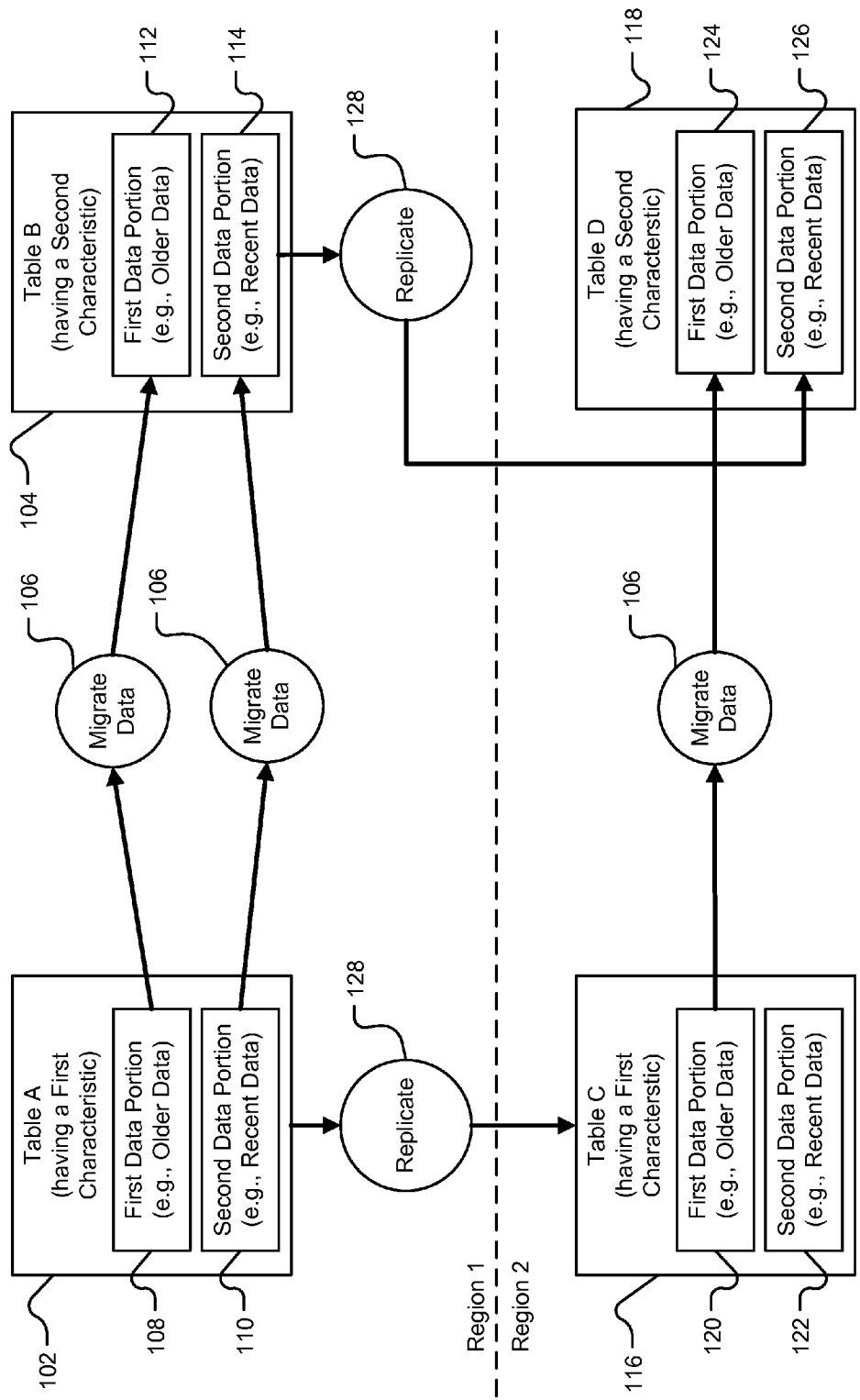

Embodiments also support data storage configurations in which data is replicated across different data warehouses (e.g., to support business operations in different regions). For example, a first database or data warehouse may store data to be used by processes or transactions associated with a first region (e.g., North America), a second database or data warehouse may store data to be used by processes or transactions associated with a second region (e.g., European Union), and data may be at least partly replicated or mirrored between the two regions. As shown in FIG. 1C, embodiments for migration described herein may perform the migration with a transformation of characteristic such that data from Table A 102 of Region 1 is migrated to Table B 104 of Region 1, while Table C 116 of Region 2 is migrated to Table D 118 of Region 2. As shown, Table A 102 and Table C 116 are replicated across regions through the operating of a replicate process 128, and a goal of embodiments may be to ensure that Table B 104 resulting from the migration is also accurately replicated across regions by Table D 118. In some embodiments, replicate process 128 may execute within the data warehouse as part of the underlying database technology deployed within the data warehouse. In some embodiments, replicate process 128 may execute within a dedicated replication server or other device, as described further with regard to FIG. 2A.

Moreover, although FIG. 1C shows a same replicate process 128 performing replication tasks to replicate Table A to Table C as well as Table B to Table D, embodiments are not so limited. In some embodiments, a first replication process may perform replication tasks to replicate Table A to Table C and a second replication process may perform replication tasks to replicate Table B to Table D. The first and second replication processes may differ at least in part in their algorithms, the devices on which they execute, and so forth.

During normal operation of Table A 102 and Table C 116, a replication process 128 may execute to ensure that data changes in Table A are replicated in Table C and/or vice versa. For example, replication process 128 may operate so that when a new row is added to Table A 102, the same row is also added to Table C 116. Because such a replication process 128 may be resource intensive to operate during migration of large amounts of data, some embodiments may provide for disabling the replication process between the newly created Table B 104 and Table D 118 while the first data portion 108 of Table A 102 (e.g., the majority of the stored data) is migrated to first data portion 112 of Table B 104. In such cases, a separate migrate data process 106 may execute independently in Region 2 to migrate data from first data portion 120 of Table C 116 to first data portion 124 of Table D 118.

In some embodiments, replication process 128 may be enabled during the second phase of the migration, e.g. while second data portion 110 of Table A 102 is being migrated to second data portion 114 of Table B 104. Because replication process 128 is enabled, it may operate to replicate the second data portion 114 across regions to second data portion 126 as the migration is occurring, instead of independently migrating the second data portion 122 of Table C 116 to the second data portion 126 of Table D 118. Embodiments operate such that Table B 104 is replicated in Table D 118 once the migration process is complete. Although FIG. 1C depicts two regions for data replication, embodiments are not so limited and may support any number of replication regions.

Because the first (e.g., larger) portion of data is migrated independently in each region while the replication process is disabled, and while the key indexing processes are also disabled, embodiments may provide for migration of the bulk of the stored data more efficiently and/or more quickly, leading to higher performance and less disruption to applications and/or customers that access the data. Moreover, because the data is stored in two locations following migration (e.g., in Table A 102 and Table B 104), embodiments provide for the possibility of rolling back the migration (e.g., reverting to use of original Table A) if it is determined that errors or corruption were introduced into Table B during migration. Such a safeguard may further reduce disruption of customer experience or degradation of performance of data-accessing applications. Embodiments are further described with reference to FIGS. 2A, 2B, 3, 4A, and 4B.

Illustrative Environments

Figure 2A:
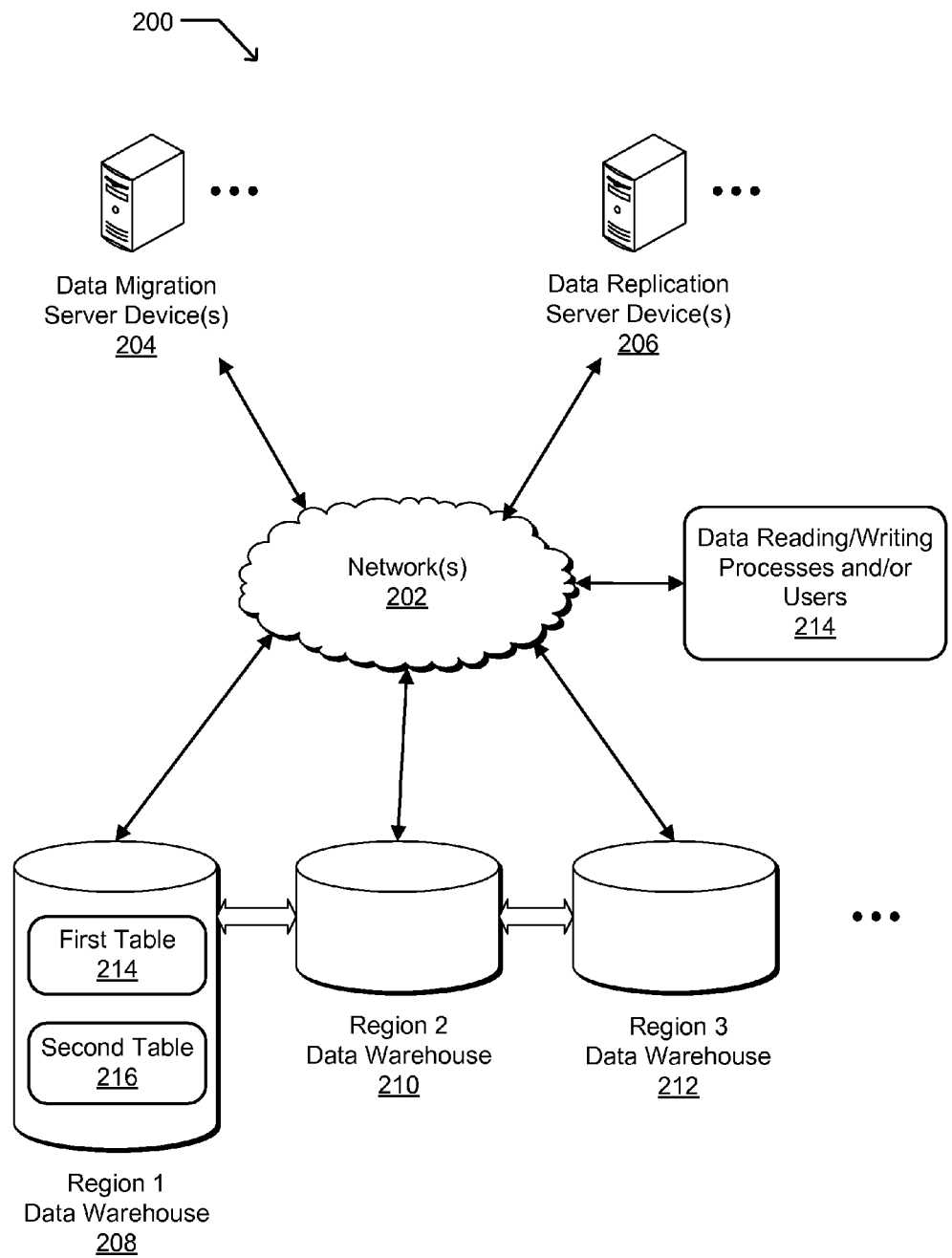
FIGS. 2A and 2B depict diagrams of example environments in which embodiments may operate.

FIG. 2A shows an example environment 200 in which embodiments may operate. In embodiments, the various devices and/or components of environment 200 may communicate with one another and with external devices via one or more networks 202. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WAN5), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

In some embodiments, environment 200 includes one or more servers such as data migration server device(s) 204 and/or data replication server device(s) 206. Data migration server device(s) 204 and/or data replication server device(s) 206 may include any type of computing device including, but not limited to, network servers, workstations, desktop computers, laptop computers, tablet computers, mobile computing devices, and the like. Further, migration server device(s) 204 and/or data replication server device(s) 206 may include one or more server devices that operate in a cluster or other grouped configuration to share resources, balance load, increase performance, provide fail-over support or redundancy, and the like.

In some embodiments, data migration server device(s) 204 include one or more hardware components and/or one or more software components (e.g., processes and/or applications) to perform data migration tasks as described herein. Moreover, in some embodiments data replication server device(s) 206 include one or more hardware and/or software components to perform data replication tasks across regions as described herein. Further, although migration server device(s) 204 and data replication server device(s) 206 are depicted as separate devices in FIG. 2A embodiments are not so limited and in some cases one or more functions of migration server device(s) 204 and data replication server device(s) 206 may be shared and/or performed on a same device or set of devices. Moreover, in some embodiments data replication functions may be performed by processes that are included in one or more of the data warehouses.

As shown in FIG. 2A, environment 200 also includes one or more data warehouses. For example, environment 200 may include Region 1 data warehouse 208, Region 2 data warehouse 210, Region 3 data warehouse 212, and/or other data warehouses to provide data access to customers and/or processes associated with other regions. In the example shown, Region 1 data warehouse 208 stores a first table 214 and a second table 216. Embodiments may enable migration of data from first table 214 to second table 216 while transforming the data from a first characteristic to a second characteristic. Although first table 214 and second table 216 are shown as being stored in a same data warehouse (e.g., Region 1 data warehouse 208), in some embodiments the first table 214 and the second table 216 may be stored in separate data warehouses. Further, as shown in FIG. 2A data may be at least in part replicated or mirrored between the various data warehouses. In some embodiments, data replication server device(s) 206 may host one or more processes (e.g., replicate process 128) to provide for replication of data between the data warehouses. Moreover, in some embodiments, replicate process 128 may be hosted on and/or executed by one or more of the data warehouses, who may accordingly perform tasks to ensure data replication between data warehouses.

Embodiments support data warehouses that include databases and tables of various database technology types, including but not limited to Oracle® databases in Oracle® Real Application Clusters (RACs), databases based Apache® Hadoop, Teradata®, and/or ParAccel® technologies, MySQL®, and/or other types of databases. Moreover, embodiments support tables of various data structures, including but not limited to relational databases, hierarchical databases, networked databases, hash tables, linked lists, flat files, and/or unstructured data.

As further shown in FIG. 2A, environment 200 may also include one or more data reading and/or data writing processes and/or users 214, that access the data stored in one or more data warehouses. In some cases a quality of service level may seek to ensure that such data accessing processes and/or users are able to reliably access the data while data migration and transformation takes place. A goal of embodiments may be to ensure such reliable access, and to provide for a roll-back to a known-good data state if corruption occurs during migration. These aspects and others are described further below.

Figure 2B:
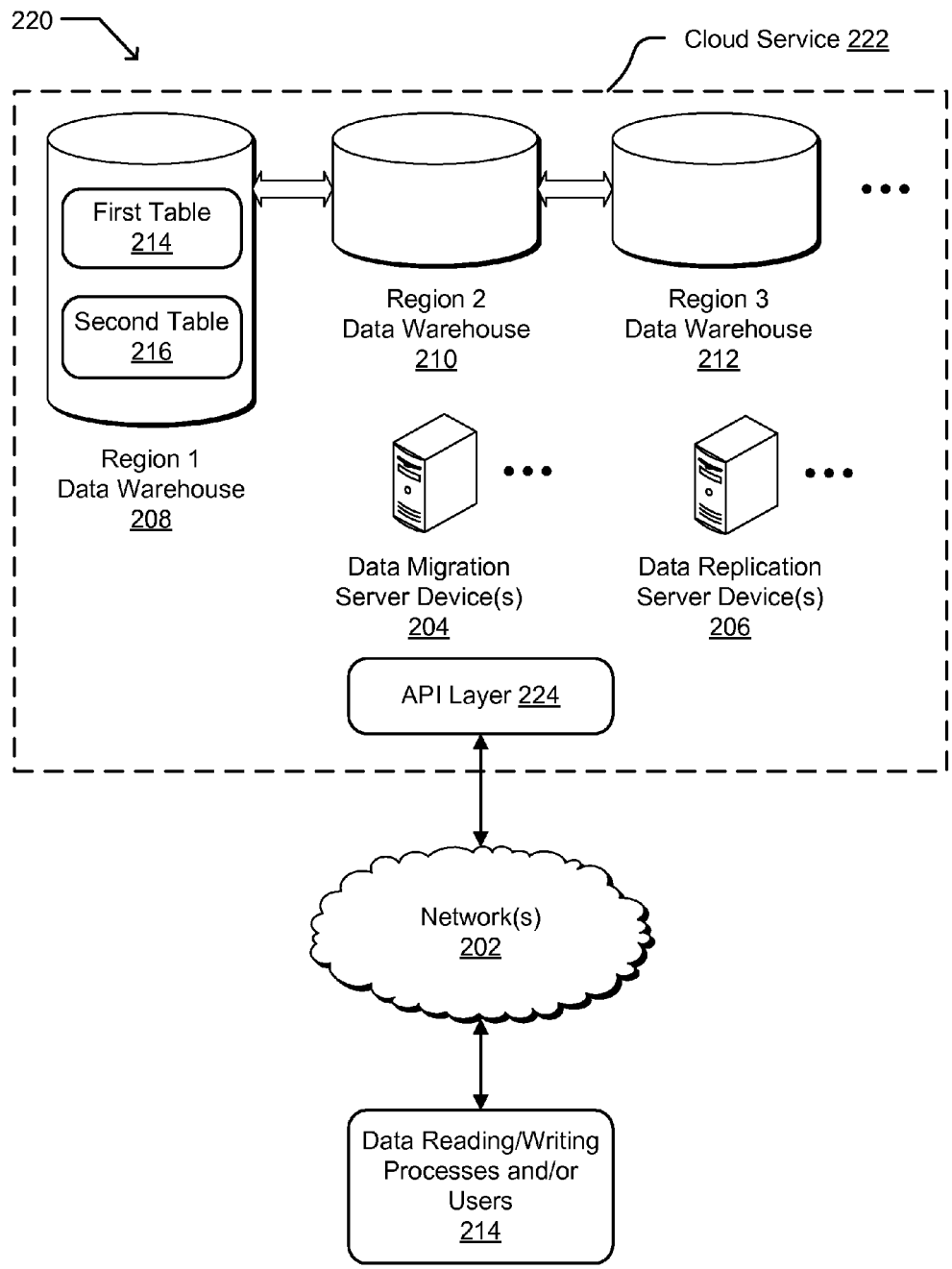

In some embodiments, data migration, data replication, and/or other data storage services may be provided as a cloud service. FIG. 2B illustrates an example of such an embodiment. FIG. 2B shows an environment 220 in which data reading and/or data writing processes and/or users 214 communicate over network(s) 202 with a cloud service 222 which includes one or more of the elements of environment 200 shown in FIG. 2A. For example, cloud service 222 may host one or more of data migration server device(s) 204, data replication server device(s) 206, and/or data warehouses 208, 210, and 212. In such cases, the data migration and/or data replication services described herein may be provided to processes and/or users as a service in the cloud, via an Application Programming Interface (API) 224 or other intermediary software or hardware.

Illustrative Computing System Architecture

Figure 3:
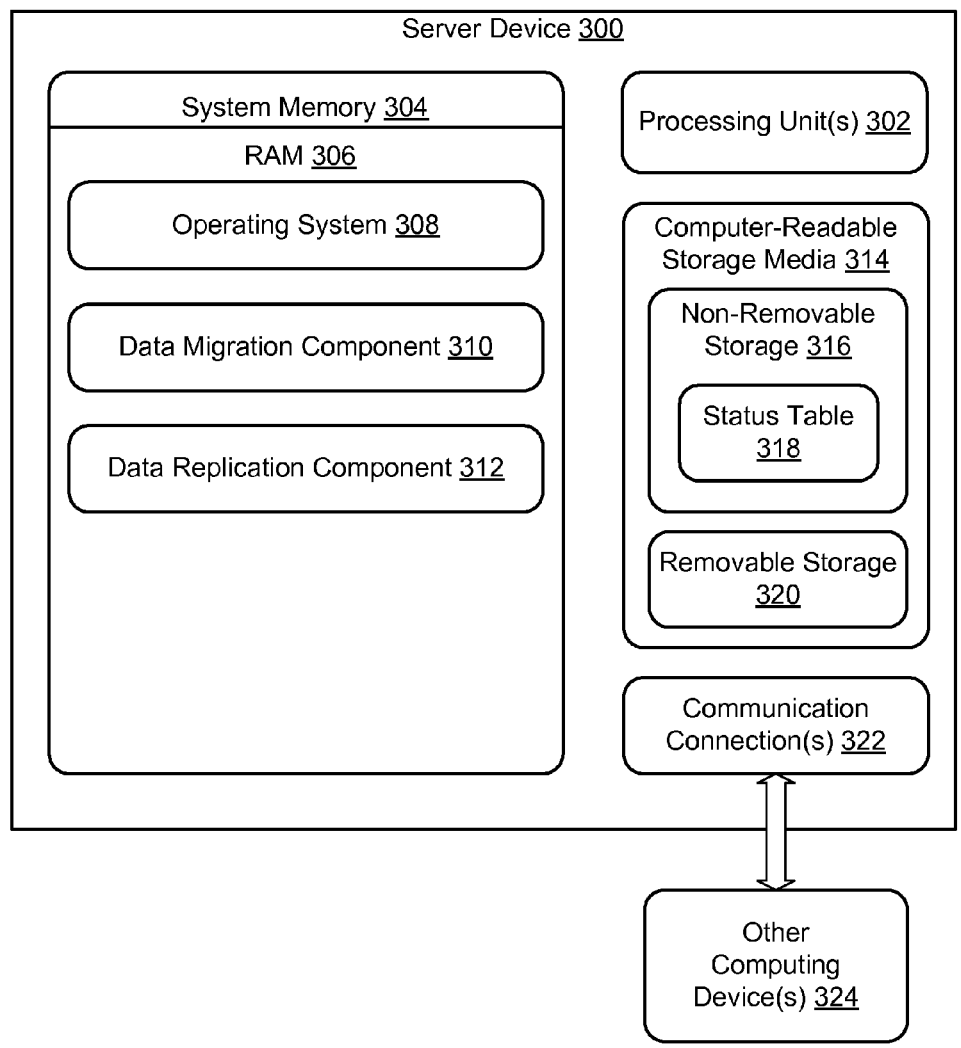
FIG. 3 depicts a diagram of an example computing system for a server device, in accordance with embodiments.

FIG. 3 depicts an example server device 300 that may support embodiments described herein. For example, server device 300 may provide an example system architecture for migration server device(s) 204 and/or data replication server device(s) 206 shown in FIG. 2A, or other devices. In some embodiments, server device 300 includes one or more processing units 302. Processing unit(s) 302 may include multiple processing units, and may be implemented as hardware, software, or some combination thereof. Processing unit(s) 302 may include one or more processors. As used herein, processor unit(s) 302 refer to hardware component(s). Processing unit(s) 302 may also include computer-executable, processor-executable, and/or machine-executable instructions written in any suitable programming language to perform various functions described herein.

As shown, server device 300 includes a system memory 304, which may include volatile memory such as random access memory (RAM) 306, static random access memory (SRAM), dynamic random access memory (DRAM), and the like. In some embodiments, RAM 306 includes one or more executing operating systems (OS) 308, and one or more executing processes including components, programs, or applications that are loadable and executable by processing unit(s) 302. Such processes may include data migration component 310 which operates to perform data migration tasks described herein, and/or data replication component 312 which operates to perform data replication tasks described herein.

In some embodiments, system memory 304 may also include non-volatile memory such as read only memory (ROM), flash memory, and the like. System memory 304 may also include cache memory, active memory, and/or physical memory used by the various processes that run within system memory 304. Further, although operating system 308, data migration component 310, and data replication component 312 are depicted as residing and/or executing within RAM 306, in some embodiments one or more of these elements may reside and/or execute at least in part in ROM or in other storage (e.g., on a hard drive), such as through the use of virtual memory, swap space, and the like.

As shown in FIG. 3, server device 300 may also include computer-readable storage media 314, which may include non-removable storage 316 (e.g., a hard drive) and/or removable storage 320, including magnetic disk storage, optical disk storage, tape storage, and the like. In some embodiments, non-removable storage 316 may store a status table 318 to indicate which table(s) are currently available for access by data writing processes and/or data reading processes as described herein. Disk drives and associated computer-readable media may provide non-volatile storage of computer readable instructions, data structures, program modules, and other data for the operation of server device 300.

As used herein, computer-readable media includes two distinct types of media: storage media and communications media. Embodiments may be provided as a computer program product stored on a non-transitory computer-readable or machine-readable storage medium. Computer-readable or machine-readable storage media (e.g., computer-readable storage media 314) includes tangible and/or non-transitory forms of media such as volatile and/or non-volatile memory. Such media may be included in a device and/or hardware component that is part of a device or external to a device, including but not limited to random-access memory (RAM), SRAM, DRAM, read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible computer storage media does not include non-tangible communication media.

Although not depicted in FIG. 3, server device 300 may further include one or more input devices to receive user input (e.g., a keyboard, a mouse, a pen, a game controller, a voice input device, a touch input device, gestural input device, and the like), and/or one or more output devices (e.g., a display, a printer, audio speakers, a haptic output, and the like). Server device 300 may further include communications connection(s) 322 that allow server device 300 to communicate with other computing devices 324 including client devices, server devices, databases, and/or other networked devices available over one or more communication networks. Server device 300 may also include one or more busses that allow for the transfer of data and/or internal communications between the various components of server device 300.

Illustrative Processes

Figure 4A:
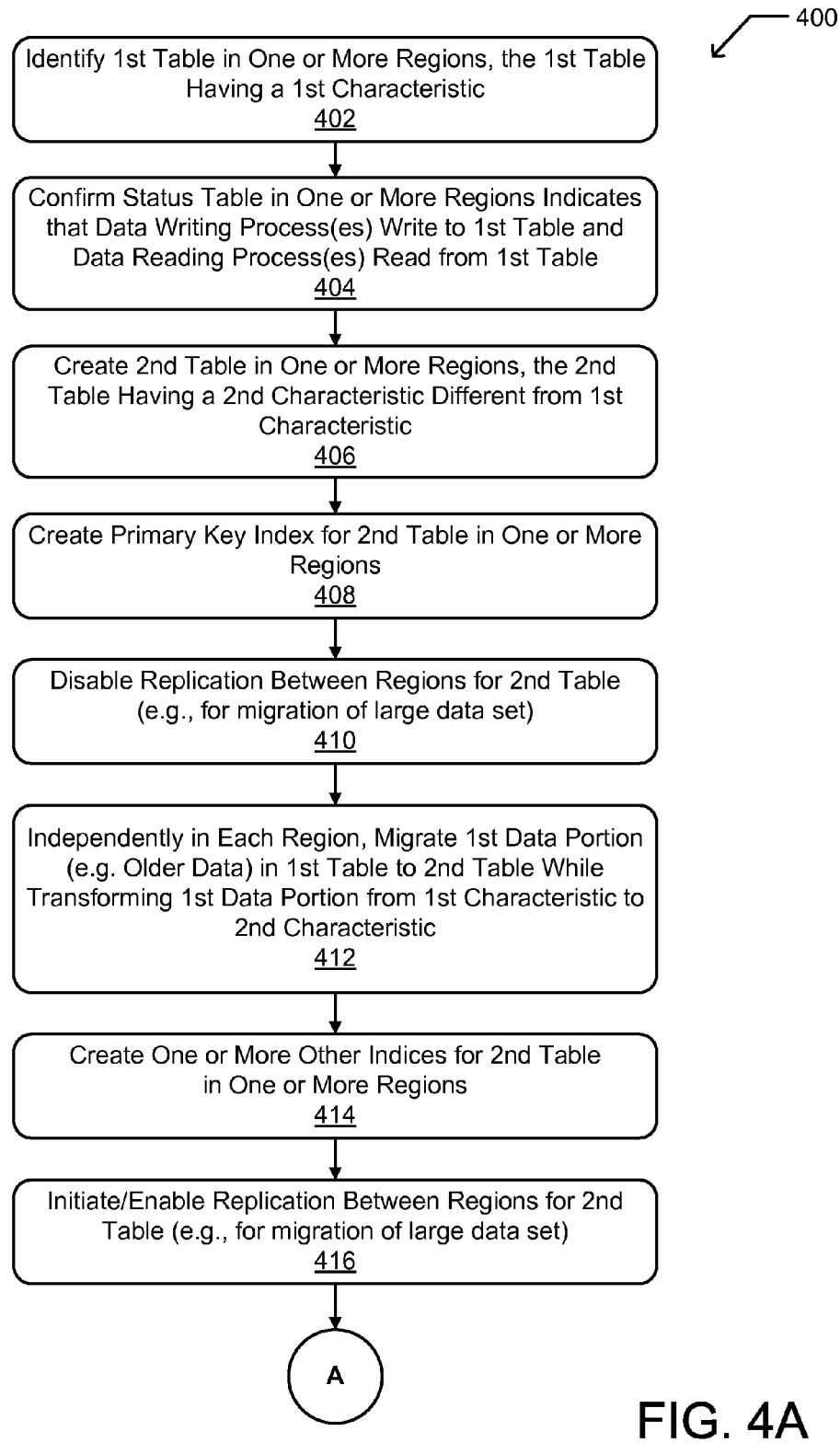
FIGS. 4A and 4B depict flow diagrams of illustrative processes for migrating data, in accordance with embodiments.
Figure 4B:
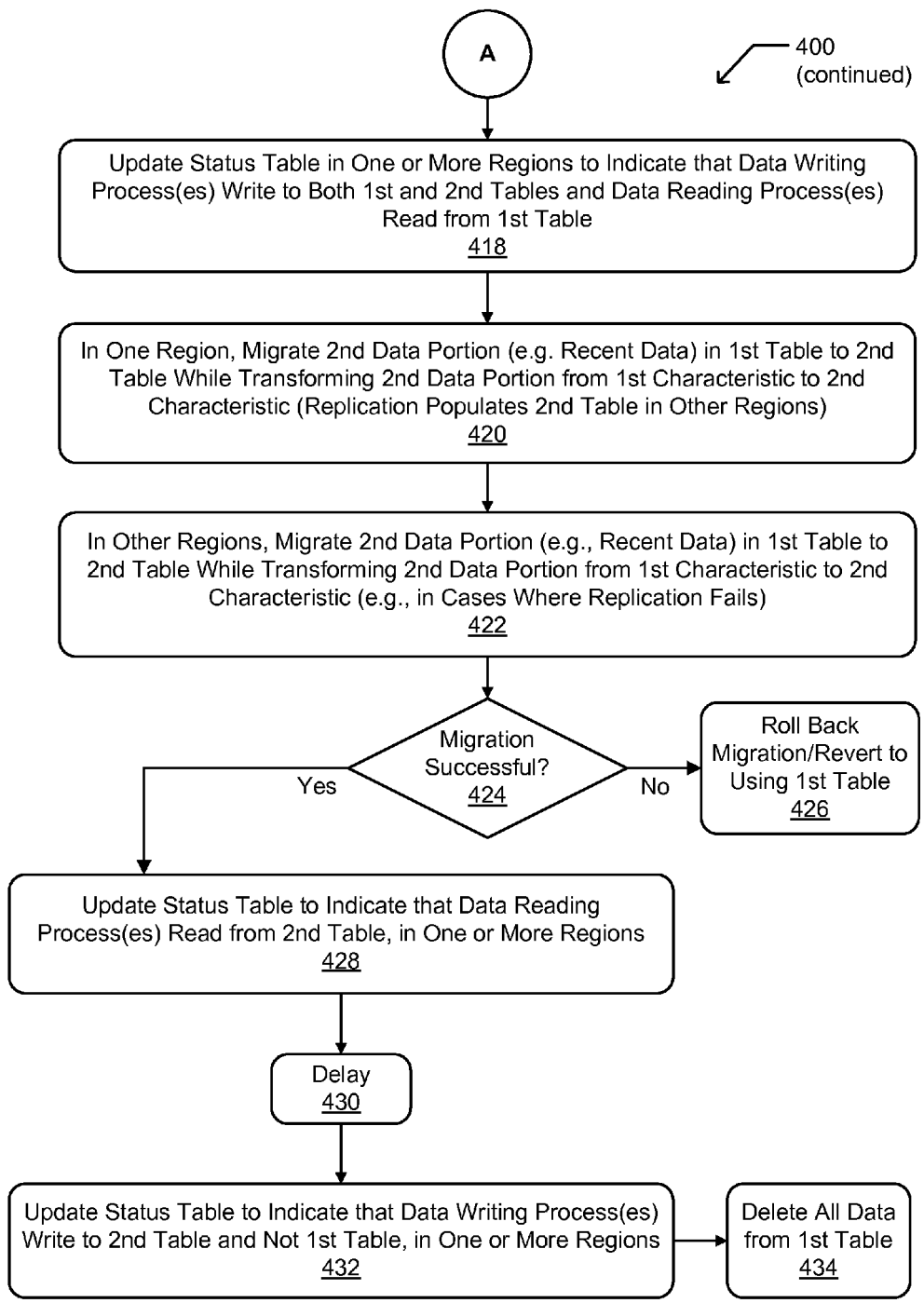

FIGS. 4A and 4B depict flowcharts showing an example process in accordance with various embodiments. The operations of this process are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described process.

FIGS. 4A and 4B depict a flow diagram of an illustrative process 400 for migrating data according to embodiments.

In some embodiments process 400 is executed by a software component such as data migration component 310 and/or by a computing device such as data migration server device(s) 204. In some embodiments one or more operations of process 400 functions may be performed by the migrate data process 106 shown in FIGS. 1A, 1B, and 1C.

At 402 a first table may be identified for data migration, the first table having a first characteristic. For example, the first table may store encrypted data that is encrypted using a first encryption key or set of keys, the first table may have a first schema, and/or the first table may have a first data structure. In some embodiments, the first table may be housed in a data warehouse that is replicated across one or more other data warehouses (e.g., across regions) and identification of the first table may include identification of one or more replicated first tables in various data warehouses for various regions.

At 404 a status table may be confirmed as indicating that one or more data writing processes are to write (e.g., insert or add new rows) to the first table and/or that one or more data reading processes are to read from the first table. In embodiments, this status (e.g., both writing processes and reading processes accessing the first table) may be the initial state of the system prior to the start of migration.

In some embodiments, data writing processes may include one or more processes that encrypt data and insert the encrypted data into the first table. For example, the data writing processes may encrypt sensitive credit card number data and/or financial institution (e.g., bank) account data and routing data into one or more encrypted tokens and insert the encrypted tokens into the first table. In some embodiments, a status table may be present for each of the one or more regions across which data is replicated, and the status table for each region may be updated. In some embodiments, a single status table may store information for all regions. In some embodiments, the status table may be updated manually to track table status. Moreover, in some embodiments the status table may be updated automatically by the migration process (e.g., by the migrate data process 106).

At 406 a second table may be created having a second characteristic (e.g., encryption key, table schema, and/or data structure) that is different from the first characteristic of the first table. A goal of the migration may be to migrate data from the first table into the second table while transforming the data from the first characteristic to the second characteristic. In embodiments with multiple replicated regions, a second table may be created in each region. Embodiments support the transformation of characteristics that include one or more of a table schema, an encryption key/method, a data structure, a storage infrastructure, or other characteristic.

At 408 a primary key index may be created for the second table in one or more regions. In some embodiments at this phase in the migration one or more other indices may not yet be created for the second table, enabling the migration of the first portion (e.g., the majority of the stored data) to proceed faster. In some embodiments where the underlying database technology is able to efficiently update indices as data is added, one or more other indices (e.g., other than the primary key index) may also be created at 408.

At 410 replication may be disabled between regions for the second table, such that rows inserted into the second table for one region are not automatically replicated into the second table for another region. This may enable the migration and transformation of the first portion of data (e.g., the majority of the stored data) to proceed more quickly and/or more efficiently (e.g., particularly in cases where a large amount of data is being migrated) given that the migration may not be limited by the network bandwidth available to the replication process.

In some embodiments, the disabling of replication may be performed where the data set being migrated is larger than a threshold size. In other cases where a smaller data set is being migrated, replication may remain enabled during migration, enabling the replication process 128 to populate the first portion of data in the second tables in other regions instead of performing an independent migration process in each region.

At 412 a first data portion in the first table may be migrated to the second table while transforming the first data portion from the first characteristic to the second characteristic. In some embodiments where replication is supported between regions, this migration may be performed independently in each region. In some embodiments, the migrated first data portion is older data (e.g., older than one day old) and forms the majority of data stored in the first table. In cases where the characteristic being transformed includes rotation of an encryption key, transformation may include decrypting the data and then re-encrypting the data using a new (e.g., rotated) encryption key.

After migration of the first data portion is completed, at 414 one or more other indices (e.g., other than the primary key index) may be created for the second table, in one or more regions. At 416 replication between regions may be enabled for the second table, such that changes (e.g., row inserts, deletes, and/or updates) may be propagated in the corresponding second table in one or more other regions for which replication is enabled. The enabling is replication at 416 may be performed in cases where the replication was disabled at 410 (e.g., in cases where a large data set is being migrated).

The description of example process 400 continues with reference to FIG. 4B. At 418 the status table may be updated to indicate that one or more data writing processes are to write to both the first and second tables, and that one or more data reading processes are to read from the first table (but not the second table). By having writing processes write to both the first and second table, embodiments may ensure that the first table continues to store up-to-date data in case the migration fails and the system is to be rolled back (e.g., revert to using the original, unmigrated first table). In some embodiments updates to the status table may be performed manually by an operator, user, or administrator, and in some embodiments updates to the status table may be performed automatically (e.g., by migrate data process 106).

At 420 the second data portion (e.g., the more recent data) may be migrated from the first table to the second table while transforming the second data portion from the first characteristic to the second characteristic. In embodiments that support replication between regions, this migration may be performed in a first region and the replication process (enabled at 416) may populate the second table in other regions with replicated and/or transformed data.

In cases where the replication between regions fails for any reason, or where replication has remained disabled, at 422 the second data portion may be migrated from the first table to the second table while transforming the second data portion from the first characteristic to the second characteristic in one or more other regions. In some embodiments, at this point in the process if the migration was successful all data from the first table has been migrated into the second table and transformed in each region.

At 424 a determination is made whether the migration has been successful. In some embodiments, an assumption is made that the migration has been successful unless data access errors are reported by customers and or processes reading from the second table. In some embodiments, a certain predetermined period of time (e.g., one hour or one day) may be used as a trial period during which time the system is monitored for such data errors, and if no errors are reported during this time the migration is determined to have been successful.

If the migration is determined to have failed at 424, the system may be rolled back at 426 to use the first table and in some embodiments the second table may be deleted to remove the corrupted data in one or more regions. Although FIG. 4B shows the test for successful migration occurring once (e.g., at 424), embodiments are not so limited, and in some embodiments a determination whether migration was successful may be made at various steps in process 400 and/or as an ongoing test. In such cases, where data corruption or migration failure is detected at any point during the migration process, the migration process may be halted and the system may be rolled back and revert to using the first table in one or more regions. Such a capability of embodiments to revert to using the first table provides for a reliability of service to data accessing applications and/or users and ensures that their access is uninterrupted while the migration is being attempted, regardless of the outcome of the migration.

If the migration is determined to be successful at 424, at 428 the status table may be updated to indicate that one or more data reading processes are to read from the second table, in one or more regions. Further, in some embodiments following a predetermined delay time period 430, the status table may be updated at 432 to indicate that data writing processes are to write to the second table and are no longer to write to the first table. In some embodiments, the delay time period 430 may be employed to ensure that all data reading processes are given time to being reading from the second table before the data writing processes are instructed to begin writing only to the second table. This may avoid a race condition in which data reading processes are still reading from the first table (e.g., reading from stale or out-of-date data) after the data writing processes have stopped writing to the first table. At 434, in some embodiments some or all data may be truncated (e.g., deleted) from the first table in one or more regions.

Conclusion

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
   identifying, by one or more computing devices including a processing unit and memory, a first database table with a first characteristic;
   creating, by the one or more computing devices, a second database table with a second characteristic that is different than the first characteristic in at least one of a table schema, an encryption key, or a data structure;
   creating, by the one or more computing devices, a primary key index for the second database table;
   creating or updating, by the one or more computing devices, a status table prior to a first phase of data migration to indicate that, during the first phase of data migration, the first database table is accessible to at least one data reading process and the first database table is accessible to at least one data writing process, wherein information included in the first database table and information included in the second database table are not included in the status table;
   migrating, by the one or more computing devices and during the first phase of data migration, a first portion of data stored in the first database table to the second database table while transforming the first portion of data from the first characteristic to the second characteristic, the first portion of data being at least as old as a threshold age;
   creating, by the one or more computing devices, one or more other indices for the second database table;
   updating, by the one or more computing devices, the status table prior to a second phase of data migration to indicate that, during the second phase of data migration, the first database table is accessible to the at least one data writing process and to the at least one data reading process; the second database table is not accessible to the at least one data reading process; and the second database table is accessible to the at least one data writing process; and
   migrating, by the one or more computing devices and during the second phase of data migration, a second portion of data stored in the first database table to the second database table while transforming the second portion of data from the first characteristic to the second characteristic, the second portion of data being more recent than the threshold age.

2. The method of claim 1 further comprising deleting all data from the first database table after completing migration of the second portion of data.

3. The method of claim 1 wherein the first database table stores sensitive data.

4. The method of claim 3 wherein the sensitive data includes at least one of credit card data or financial institution account data.

5. The method of claim 1 wherein the first database table stores data that is at least in part static data.

6. A system comprising:
   at least one processor;
   at least one data storage medium, storing:
   a first table with a first characteristic;
   a second table with a second characteristic that is different from the first characteristic; and
   a status table indicating which of the first table and the second table are available for access by at least one writing process and at least one reading process, wherein information included in the first table and information included in the second table are not included in the status table; and
   a data migration component executed by the at least one processor to:
   update the status table to indicate that, during a first phase of data migration, the first table is accessible to the at least one reading process and the first table is accessible to the at least one writing process;
   migrate, during the first phase of data migration, a first data portion stored in the first table to the second table while transforming the first data portion from the first characteristic to the second characteristic;
   update the status table to indicate that, during a second phase of data migration, the first table is accessible to the at least one reading process and to the at least one writing process, the second table is not accessible to the at least one reading process, and the second table is accessible to the at least one writing process; and migrate, during the second phase of data migration, a second data portion stored in the first table to the second table while transforming the second data portion to the second characteristic, the second data portion being more recent than a threshold age.

7. The system of claim 6 wherein the first table and the second table are associated with a table category for sensitive data.

8. The system of claim 7 wherein the sensitive data includes at least one of credit card data or financial institution account data.

9. The system of claim 6 wherein the first data portion is at least as old as the threshold age, and wherein the second data portion is more recent than the threshold age.

10. The system of claim 6 wherein the threshold age is one day.

11. The system of claim 6 wherein the status table is one of a plurality of status tables and individual status tables of the plurality of status tables are related to a respective region of data to be migrated.

12. The system of claim 6 wherein the status table is updated to indicate that the first table is not accessible to the at least one writing process a predetermined delay time after updating the status table to indicate that the second table is accessible to the at least one reading process.

13. The system of claim 6 wherein the first characteristic differs from the second characteristic in one or more of a table schema, an encryption, a data structure, or a storage infrastructure.

14. A computer-implemented method comprising:
updating, by one or more computing devices including a processing unit and memory, a status table to indicate that, during a first phase of data migration, a first database table is accessible to at least one data reading process and to at least one data writing process, wherein information included in the first database table and information included in a second database table are not included in the status table;
migrating, by the one or more computing devices and during the first phase of data migration, a first data portion stored in the first database table with a first characteristic to the second database table with a second characteristic that is different from the first characteristic, while transforming the first data portion from the first characteristic to the second characteristic;
updating, by the one or more computing devices, the status table to indicate that, during a second phase of data migration, the first database table is accessible to the at least one data reading process and to the at least one data writing process, the second database table is not accessible to the at least one data reading process, and the second database table is accessible to the at least one data writing process; and
migrating, by the one or more computing devices, a second data portion stored in the first database table to the second database table while transforming the second data portion from the first characteristic to the second characteristic, the second data portion being more recent than a threshold age.

15. The method of claim 14 wherein the first characteristic differs from the second characteristic in one or more of a table schema, an encryption, a data structure, or a storage infrastructure.

16. The method of claim 14 wherein:
the first database table and the second database table are associated with a first region;
the first database table is replicated by a third database table with the first characteristic, the third database table being associated with a second region; and
the second database table is replicated by a fourth database table with the second characteristic, the fourth database table being associated with the second region.

17. The method of claim 16 further comprising:
independently migrating a replicated first data portion stored in the third database table to the fourth database table, while transforming the replicated first data portion from the first characteristic to the second characteristic; and
prior to migrating the second data portion, initiating a replication process that replicates the second database table with the fourth database table, such that the second data portion is replicated to the fourth database table concurrently with the migrating of the second data portion to the second database table.

18. The method of claim 14 wherein the first data portion is at least as old as the threshold age, and wherein the second data portion is more recent than the threshold age.

19. The method of claim 14 further comprising disabling replication of a first change to the first database in the second database during the first phase of data migration and enabling replication of a second change to the first database in the second database during the second phase of data migration.

20. The method of claim 14 wherein at least one of the first database table and the second database table stores encrypted data.

21. The method of claim 14 wherein at least one of the first database table and the second database table stores encrypted data that is encrypted using a Hash-Based Message Authentication Code (HMAC) based technique.

22. The method of claim 14 wherein the first characteristic differs from the second characteristic in that the second characteristic includes a different encryption technique from the first characteristic and in that the second characteristic includes a table schema with an additional column than a table schema of the first characteristic, the additional column associated with the different encryption technique.

23. The method of claim 22 wherein the different encryption technique is a HMAC based technique.

24. One or more non-transitory computer-readable storage media storing instructions that, when executed, instruct at least one processor to perform actions comprising:
updating a status table to indicate that, during a first phase of data migration, a first database table is accessible to at least one data writing process and at least one data reading process, wherein information included in the first database table and information included in a second database table are not included in the status table;
migrating, during the first phase of data migration, a first data portion stored in the first database table with a first characteristic to the second database table with a second characteristic that is different from the first characteristic, while transforming the first data portion from the first characteristic to the second characteristic, the first characteristic differing from the second characteristic in at least one of a table schema, an encryption key, or a data structure;
updating the status table to indicate that, during a second phase of data migration, the first database table is accessible to the at least one data writing process and to the at least one data reading process, the second database table is accessible to the at least one data writing process, and the second database table is not accessible to the at least one data reading process; and migrating, during the second phase of data migration, a second data portion stored in the first database table to the second database table while transforming the second data portion from the first characteristic to the second characteristic, the second data portion being more recent than a threshold age.

25. The one or more non-transitory computer-readable storage media of claim 24, wherein the first database table and the second database table store sensitive data including at least one of credit card data or financial institution account data.

26. The one or more non-transitory computer-readable storage media of claim 24, wherein the actions further comprise disabling key indexing during the first phase of data migration.

27. The one or more non-transitory computer-readable storage media of claim 24, wherein the first data portion is at least as old as the threshold age, and wherein the second data portion is more recent than the threshold age.

\* \* \* \* \*